United States Patent
Douglas et al.

(10) Patent No.: US 11,978,055 B2
(45) Date of Patent: *May 7, 2024

(54) METHOD AND SYSTEM FOR PROVIDING ALERT MESSAGES RELATED TO SUSPICIOUS TRANSACTIONS

(71) Applicant: Capital One Services, LLC, McLean, VA (US)

(72) Inventors: Lawrence Douglas, McLean, VA (US); Robert D. Rowley, Garnet Valley, PA (US); Philip Kim, New Canaan, CT (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,712

(22) Filed: May 18, 2023

(65) Prior Publication Data
US 2023/0289809 A1  Sep. 14, 2023

Related U.S. Application Data

(63) Continuation of application No. 17/327,247, filed on May 21, 2021, now Pat. No. 11,715,107, which is a continuation of application No. 15/880,186, filed on Jan. 25, 2018, now Pat. No. 11,042,881, which is a continuation of application No. 14/592,748, filed on Jan. 8, 2015, now abandoned.

(60) Provisional application No. 61/925,458, filed on Jan. 9, 2014.

(51) Int. Cl.
*G06Q 30/02* (2023.01)
*G06Q 20/40* (2012.01)
*G06Q 30/0251* (2023.01)

(52) U.S. Cl.
CPC ..... *G06Q 20/4016* (2013.01); *G06Q 30/0253* (2013.01)

(58) Field of Classification Search
None
See application file for complete search history.

(56) References Cited

U.S. PATENT DOCUMENTS 9,152,974 B1 * 10/2015 Behm ................ G06Q 20/407
2008/0154783 A1 * 6/2008 Rule ................ G06Q 50/188
705/80

(Continued)

*Primary Examiner* — David J Stoltenberg
(74) *Attorney, Agent, or Firm* — Perkins Coie LLP

(57) ABSTRACT

Systems and methods are provided for providing alerts to a user. The systems and methods may include a financial service provider including a memory device storing instructions. The financial service provider may also include at least one processor configured to execute the instructions to perform a plurality of operations. The operations may include receiving data relating to an activity of a user. The operations may also include identifying a merchant based at least on the received data. The operations may also include accessing historical fraud or disputes data associated with at least one of the user and the merchant. The operations may also include determining whether the received data triggers an alert. The operations may further include sending an alert message to a user device associated with the user when the processor determines that the received data triggers the alert.

20 Claims, 11 Drawing Sheets

(56) References Cited

U.S. PATENT DOCUMENTS

2013/0339186 A1* 12/2013 French .................. G06F 21/577
705/26.35
2014/0337938 A1* 11/2014 Abhyanker ............ G06Q 50/01
726/5

* cited by examiner

METHOD AND SYSTEM FOR PROVIDING ALERT MESSAGES RELATED TO SUSPICIOUS TRANSACTIONS

CROSS REFERENCE RELATED TO APPLICATIONS

This application is a continuation of U.S. patent application Ser. No. 17/327,247, filed May 21, 2021, which is a continuation of U.S. patent application Ser. No. 15/880,186, filed Jan. 25, 2018, which is a continuation of U.S. patent application Ser. No. 14/592,748, filed Jan. 8, 2015, which claims the benefit of priority of U.S. Provisional Patent Application No. 61/925,458, filed Jan. 9, 2014. The disclosures of which are hereby incorporated by reference in their entirety.

TECHNICAL FIELD

The disclosed embodiments generally relate to systems and methods for providing alert messages to users, and more particularly, to systems and methods for providing alert messages related to suspicious transactions to users of financial service products and services.

BACKGROUND

Fraudulent transactions and transaction disputes continue to increase in the financial sector, raising ever-growing concerns for financial service providers, consumers, and merchants. In particular, with the wide spread of e-commerce, user identities and financial information are becoming more and more vulnerable to theft, bad faith merchant practices, or other unauthorized use. When a user of a bank card or account notices an unauthorized transaction, or when the user otherwise disputes a transaction made using the bank card or account, the user may report it to the financial institution, which may investigate the transaction and attempt to resolve the dispute between the merchant and the user. Monitoring every transaction, however, can impose a serious burden on the user, particularly when the user has multiple bank cards or accounts. In addition, users that observe a suspicious transaction associated with a product or service purchased from a merchant may not have the time and energy to dispute the transaction, which may not only cause monetary loss to the users, but also encourage continued abusive practices.

Financial institutions that issue or manage bank cards or accounts often have anti-fraud systems for monitoring fraudulent transactions. When a fraudulent transaction is detected, the anti-fraud systems may notify the user. Such anti-fraud systems, however, lack the capability to provide precautionary notifications to users about suspicious transactions that may not be fraudulent but have an increased likelihood of being subject to future disputes. In addition, existing anti-fraud systems typically rely primarily on crowd-sourced feedback, which may not provide an accurate detection of suspicious transactions. Accordingly, there is a need for methods and systems for assisting users in identifying suspicious transactions.

SUMMARY

Disclosed embodiments provide methods and systems for providing alerts to a user, particularly alert messages related to suspicious transactions associated with financial service products and services. Aspects of the disclosed methods and systems may reduce burdens on the individual associated with monitoring such transactions, and may provide a convenient, efficient, and easy-to-use solution for identifying potentially risky or suspicious transactions. For example, the disclosed methods and systems may notify a user that a merchant may have a low rating or poor review before the user completes a transaction with the merchant. This may assist the user in making an informed decision about whether the transaction should be cancelled to avoid potential trouble and future disputes.

Consistent with a disclosed embodiment, a system for providing alerts to a user is provided. The system may include a memory device storing instructions. The system may also include at least one processor configured to execute the instructions to perform a plurality of operations. The operations may include receiving data relating to a transaction activity of the user and identifying a merchant based at least on the received data The operations may also include accessing historical fraud or disputes data associated with at least one of the user and the merchant. The operations may also include determining whether the received data triggers an alert. The operations may further include sending an alert message to a user device associated with the user when the processor determines that the received data triggers the alert.

Consistent with another disclosed embodiment, a computer-implemented method for providing alerts to a user is provided. The method may include receiving data relating to a transaction activity of the user and identifying a merchant based at least on the received data The method may also include accessing, via at least one processor, historical fraud or disputes data associated with at least one of the user and the merchant. The method may also include determining whether the received data triggers an alert. The method may further include sending an alert message to a user device associated with the user when the at least one processor determines that the received data triggers the alert.

Consistent with other disclosed embodiments, tangible, non-transitory computer-readable storage media may store program instructions that are executable by one or more processors to implement any of the processes disclosed herein. In one embodiment, a non-transitory computer-readable medium is provided. The non-transitory computer-readable medium may be encoded with instructions that, when executed by at least one processor, cause the at least one processor to perform a plurality of operations. The operations may include receiving data relating to a transaction activity of a user and identifying a merchant based at least on the received data. The operations may also include accessing historical fraud or disputes data associated with at least one of the user and the merchant. The operations may also include determining whether the received data triggers an alert and sending an alert message to a user device associated with the user when the processor determines that the received data triggers the alert.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to systems and methods for providing alerts to customers (or users) of financial service providers. A computer-executed software application ("app"), such as an FSP app, may be provided by a financial service provider ("FSP") The FSP app may identify that a user has made or will make a transaction at a merchant, and may provide an alert message to the user regarding the transaction and/or the merchant. The alert message may take any suitable form, such as, for example, an electronic message, text message, multimedia message, online post, in-app alert, etc. The FSP may be a bank, a credit card company, an investment company, or other entity which handles financial transactions for individuals and/or merchants. Financial transactions may include, for example, payment of a user purchase of products or services from a merchant using a credit card, debit card, bank account, loyalty card, etc. The FSP app may be a standalone software application executed by FSP server processor(s). Additionally or alternatively, the FSP app may be a standalone software application for a personal computing device, such as personal computer software or a mobile device app. The FSP app may be part of another software application provided by the FSP for managing finances related to banking, credit accounts, debit accounts, etc.

The FSP may identify suspicious transactions. Suspicious transactions may include fraudulent transactions or transactions that are not necessarily fraudulent but are likely to be subject to future disputes. The FSP may identify suspicious transactions before, during, or after the FSP customers conduct such transactions. For example, after the FSP identifies a suspicious transaction, the FSP app may send an alert message to the user to caution the user that the transaction may be fraudulent, or that the merchant has poor ratings or reviews, which may mean that the products and/or services purchased from the merchant may have an increased likelihood of being subject to future disputes, as compared to merchants with strong ratings or reviews. Based on a user response received from the user, the FSP may provide, e.g., through the FSP app, further information to the user regarding the merchant, such as ratings and reviews of the merchant, to assist the user to make a decision as to whether the transaction should be avoided or canceled to avoid future trouble or disputes. Thus, disclosed methods and systems may ultimately reduce the likelihood of fraud, dispute, and abuse.

Figure 1:
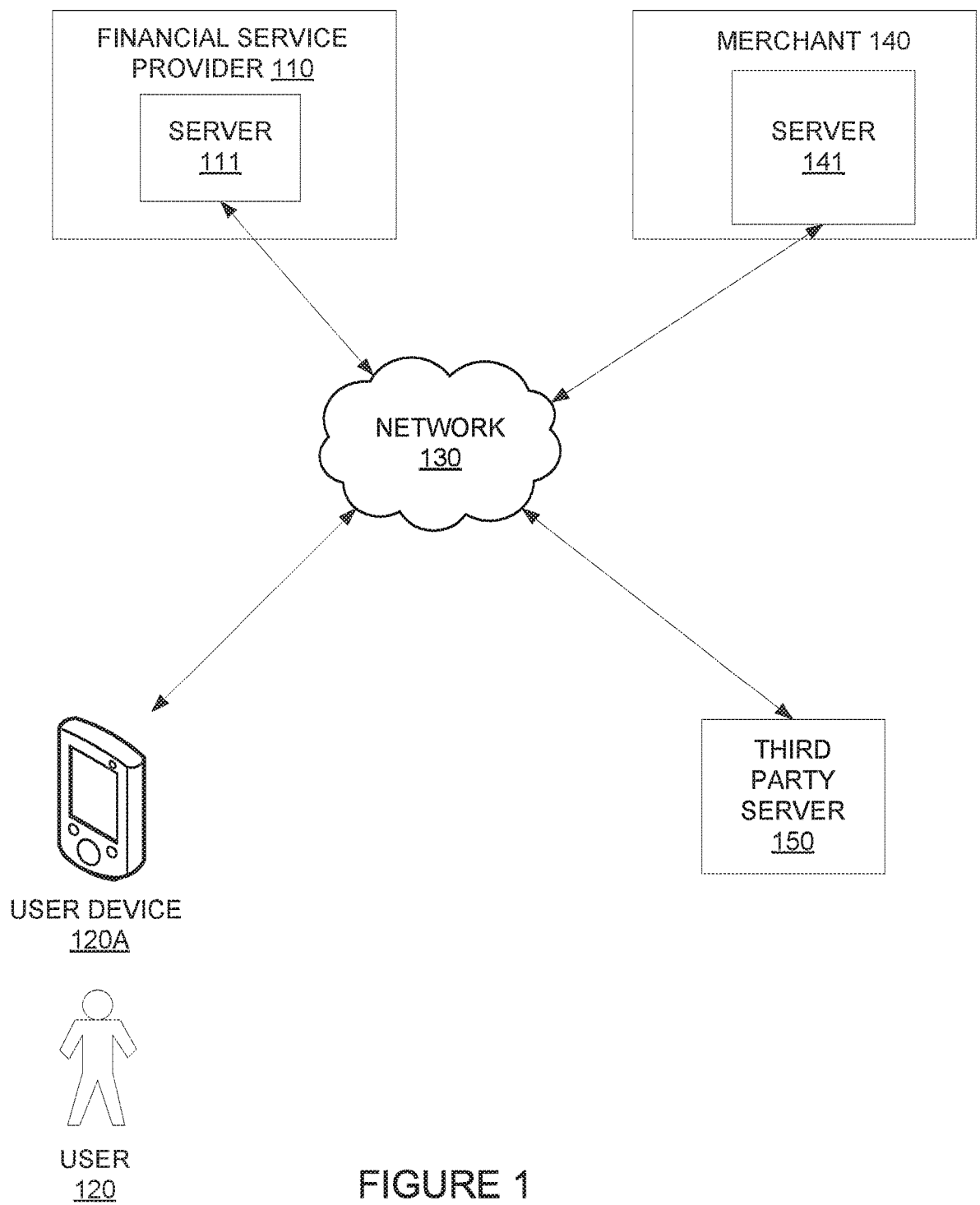
FIG. 1 shows a diagram of an exemplary system that may be used to provide alerts to users, consistent with disclosed embodiments.

FIG. 1 shows a diagram of an exemplary system that may be configured to provide alerts to users, consistent with disclosed embodiments. The components and arrangements shown in FIG. 1 are not intended to limit the disclosed embodiments, as the components used to implement the disclosed processes and features may vary.

In accordance with disclosed embodiments, an alert system 100 may include an FSP 110. FSP 110 may be a bank, a credit card company, a lender, or other type of financial service entity that generates, provides, manages, and/or maintains financial service accounts for one or more users, such as credit cards, debit cards, etc. FSP 110 may operate at least one server 111. Server 111 may be a computer-based system including computer system components, desktop computers, workstations, tablets, hand held computing devices, memory devices, and/or internal network(s) connecting the components. Server 111 is discussed in additional detail with respect to FIG. 2, below.

User 120 may operate a user device 120A, which may be a desktop computer, laptop, tablet, smartphone, multifunctional watch, pair of multifunctional glasses, tracking device, or any suitable device with computing capability. User device 120A may have the FSP app installed thereon, which may enable user device 120A to communicate with FSP 110, such as server 111, through a network 130. User device 120A is discussed in additional detail with respect to FIG. 3, below.

Network 130 may comprise any type of computer networking arrangement used to exchange data. For example, network 130 may be the Internet, a private data network, a virtual private network using a public network, a WiFi network, a LAN or WAN network, and/or other suitable connections that may enable information exchange among various components of alert system 100. Network 130 may also include a public switched telephone network ("PSTN") and/or a wireless cellular network. Network 130 may be a secured network or unsecured network.

Merchant 140 may be a company that sells products and/or services, such as a grocery store, an online retailer, or an auto repair shop, etc. Merchant 140 may include at least one server 141. Server 141 may be any suitable server known in the art, which may include at least one processor, a storage device, such as a hard drive or a memory, and an input/output interface, such as a network communication interface, which are not shown in FIG. 1. In some aspects, server 141 may include the same or similar configuration and/or components of server 111. Server 141 may include a computer-based system, which may include hardware and/or software installed therein for performing methods and processes disclosed herein. Server 141 may also enable merchant 140 to sell products and/or services through network 130 to user 120. For example, user 120 may use user device 120A to browse a webpage of merchant 140 that runs on server 141, and may make a purchase of products or services offered by merchant 140 through the webpage. Server 141 may communicate with server 111 of FSP 110. For example, user 120 may use a bank card managed by FSP 110 to purchase products or services from merchant 140, and merchant 140 may report such a transaction to server 111 in order to, for example, verify authentication information about the bank card used by user 120.

Alert system 100 may also include a third party server 150. Third party server 150 may communicate with at least one of FSP 110, merchant 140, and user device 120A via network 130. Third party server 150 may be associated with a third party. The third party may be, for example, a bank other than FSP 110, a credit reporting agency, a social network company, a rating company, a survey company, or any other suitable data reporting source. Third party server 150 may provide information or data to at least one of FSP 110, merchant 140, or user device 120A. For example, in some embodiments, third party server 150 may send ratings and reviews data about merchant 140 to FSP 110 and/or user device 120A. In some embodiments, third party server 150 may send data relating to a credit rating of user 120 to FSP 110. In some embodiments, third party server 150 may provide location information about user 120 to FSP 110.

Other components known to one of ordinary skill in the art may be included in alert system 100 to process, transmit, provide, and receive information consistent with the disclosed embodiments. In addition, although not shown in FIG. 1, components of system 100 may communicate with each other through direct communications, rather than through network 130. Direct communications may use any suitable technologies, including, for example, Bluetooth™, Bluetooth LE™, WiFi, near field communications (NFC), or other suitable communication methods that provide a medium for transmitting data between separate devices.

Figure 2:
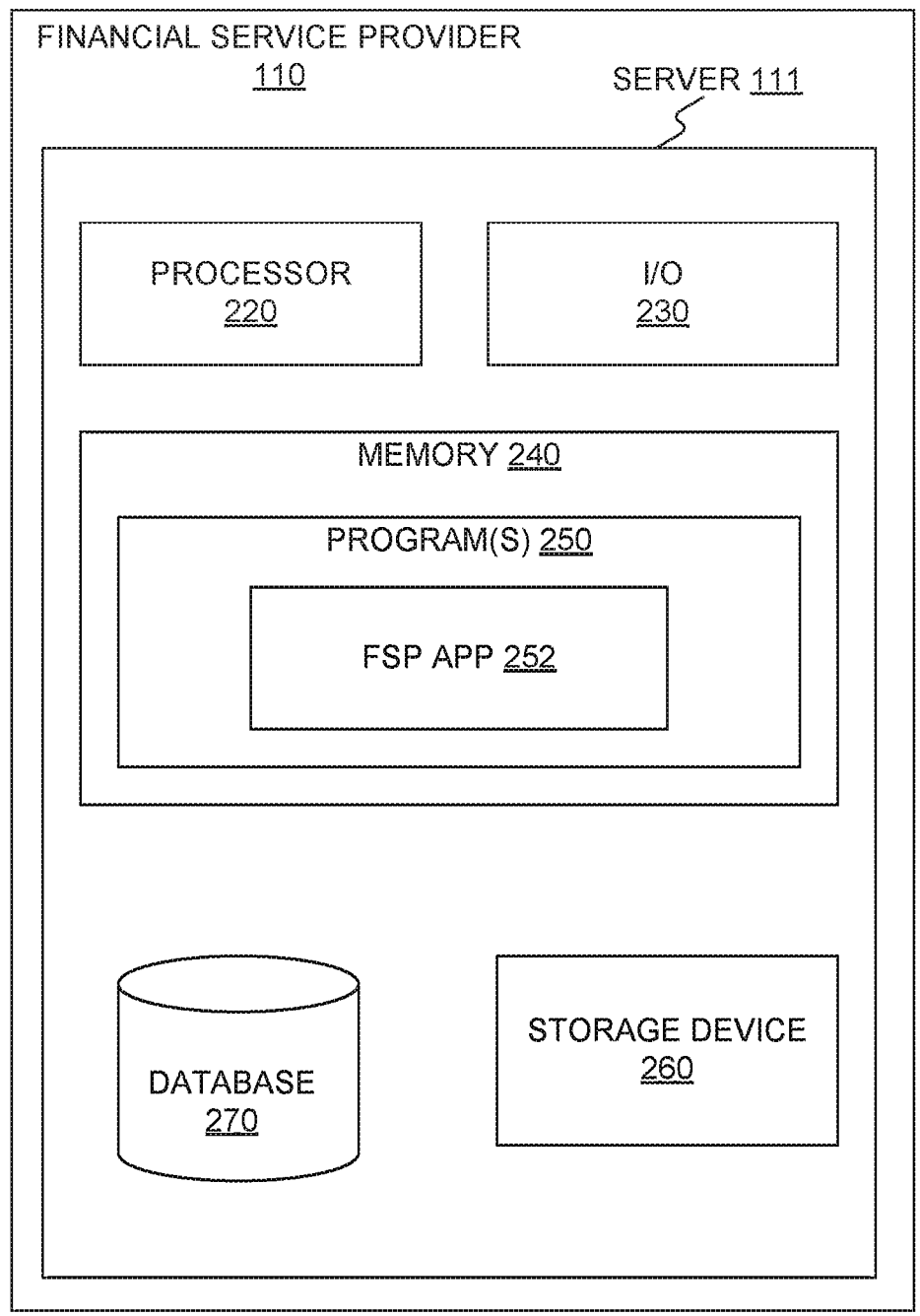
FIG. 2 shows a component diagram of an exemplary financial service provider, consistent with disclosed embodiments.

FIG. 2 shows a diagram of an exemplary financial service provider ("FSP") 110, consistent with disclosed embodiments. As shown, FSP 110 may include at least one server 111. Although discussed here in relation to FSP 110, it should be understood that variations of server 111 may be used by other components of alert system 100, including server 141 of merchant 140, user device 120A, and third party server 150. Server 111 may be a single server or may be configured as a distributed computer system including multiple servers or computers that interoperate to perform one or more of the processes and functionalities associated with the disclosed embodiments.

Server 111 may include one or more processors 220, an input/output ("I/O") device 230, and a memory 240. Processor 220 may be one or more known processing devices, such as a microprocessor from the Pentium™ family manufactured by Intel™ or the Turion™ family manufactured by AMO™. Processor 220 may constitute a single core or multiple core processor that executes parallel processes simultaneously. For example, processor 220 may be a single core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc. multiple software processes, applications, programs, etc. In another embodiment, processor 220 may include a multiple-core processor arrangement (e.g., dual, quadcore, etc.) configured to provide parallel processing functionalities to allow server 111 to execute multiple processes simultaneously. One of ordinary skill in the art would understand that other types of processor arrangements could be implemented that provide for the capabilities disclosed herein.

FSP 110 may include one or more storage units configured to store information used by processor 220 (or other components) to perform certain functions related to the disclosed embodiments. In one embodiment, server 111 may include memory 240. Memory 240 may store one or more operating systems that perform known operating system functions when executed by processor 220. By way of example, the operating systems may include Microsoft Windows™ Unix™, Linux™, Android™ Apple™ Computers type operating systems, or other types of operating systems. Accordingly, embodiments of the disclosed invention may operate and function with computer systems running any type of operating system. Memory 240 may store instructions to enable processor 220 to execute one or more applications, such as server applications, an alert application, network communication processes, and any other type of application or software. Alternatively, the instructions, application programs, etc., may be stored in an external storage (not shown) in communication with server 111 via network 130 or any other suitable network. Memory 240 may be a volatile or non-volatile, magnetic, semiconductor, tape, optical, removable, non-removable, or other type of storage device or tangible (i.e., non-transitory) computer-readable medium.

In one embodiment, memory 240 may be encoded with one or more programs 250. Programs 250 stored in memory 240, and executed by processor 220, may include an FSP app 252. FSP app 252 may cause processor 220 to execute one or more processes related to financial services provided to customers including, but not limited to, processing credit and debit card transactions, checking transactions, fund deposits and withdrawals, transferring money between financial accounts, lending loans, processing payments for credit card and loan accounts, identifying potentially suspicious transactions which may be fraudulent or likely to be subject to disputes, sending alerts to user 120 regarding such transactions, providing ratings and reviews of merchants to user 120, and/or processing transaction disputes. In some embodiments, programs 250 may be stored in an external storage device, such as a cloud server located outside of server 111, and processor 220 may execute programs 250 remotely.

Server 111 may further include a storage device 260, which may be a volatile or non-volatile, magnetic, semiconductor, tape, optical, removable, non-removable, or other type of storage device or tangible (i.e., non-transitory) computer-readable medium. For example, storage device 260 may include at least one of a hard drive, a flash drive, a memory, a Compact Disc (CD), a Digital Video Disc (DVD), or a Blu-Ray™ disc. Storage device 260 may store data that may be used by processor 220 for performing various methods and processes disclosed herein. Data stored at storage device 260 may include historical fraud or disputes data, transaction data, credit rating of user 120 and/or merchant 140, ratings and reviews of merchant 140. Historical fraud or disputes data may include past fraud or disputes involving transactions related to merchant 140 and/or user 120, resolutions of the fraud or disputes, patterns of fraud or disputes associated with merchant 140 and/or user 120, correlations between merchant 140, types of products and/or services, and user 120 involved in such fraud or disputes. Although not shown in FIG. 2, storage device 260 may store programs 250.

Server 111 may include at least one database 270. Database 270 may store data that may be used by processor 220 for performing methods and processes associated with disclosed embodiments. Data stored in database 270 may include any suitable data, such as information relating to user 120 and/or merchant 140, information relating to transactions, and information relating to ratings and reviews of merchant 140. Database 270 may store data that are similar to those stored in storage device 260. Although shown as a separate unit in FIG. 2, it is understood that database 270 may be part of memory 240, storage device 260, or an external storage device located outside of server 111.

At least one of memory 240, storage device 260, and/or database 270 may store data and instructions used to perform one or more features of the disclosed embodiments. At least one of memory 240, storage device 260, and/or database 270 may also include any combination of one or more databases controlled by memory controller devices (e.g., server(s), etc.) or software, such as document management systems, Microsoft SOL databases, SharePoint databases, Oracle™ databases, Sybase™ databases, or other relational databases. Server 111 may also be communicatively connected to one or more remote memory devices (e.g., databases (not shown)) through network 130 or a different network. The remote memory devices may be configured to store information and may be accessed and/or managed by server 111. Systems and methods consistent with the disclosed embodiments, however, are not limited to separate databases or even to the use of a database.

Server 111 may also include at least one I/O device 230 that may comprise one or more interfaces for receiving signals or input from devices and providing signals or output to one or more devices that allow data to be received and/or transmitted by server 111. For example, server 111 may include interface components, which may provide interfaces to one or more input devices, such as one or more keyboards, mouse devices, and the like, which may enable server 111 to receive input from an operator of FSP 110 (not shown).

Figure 3:
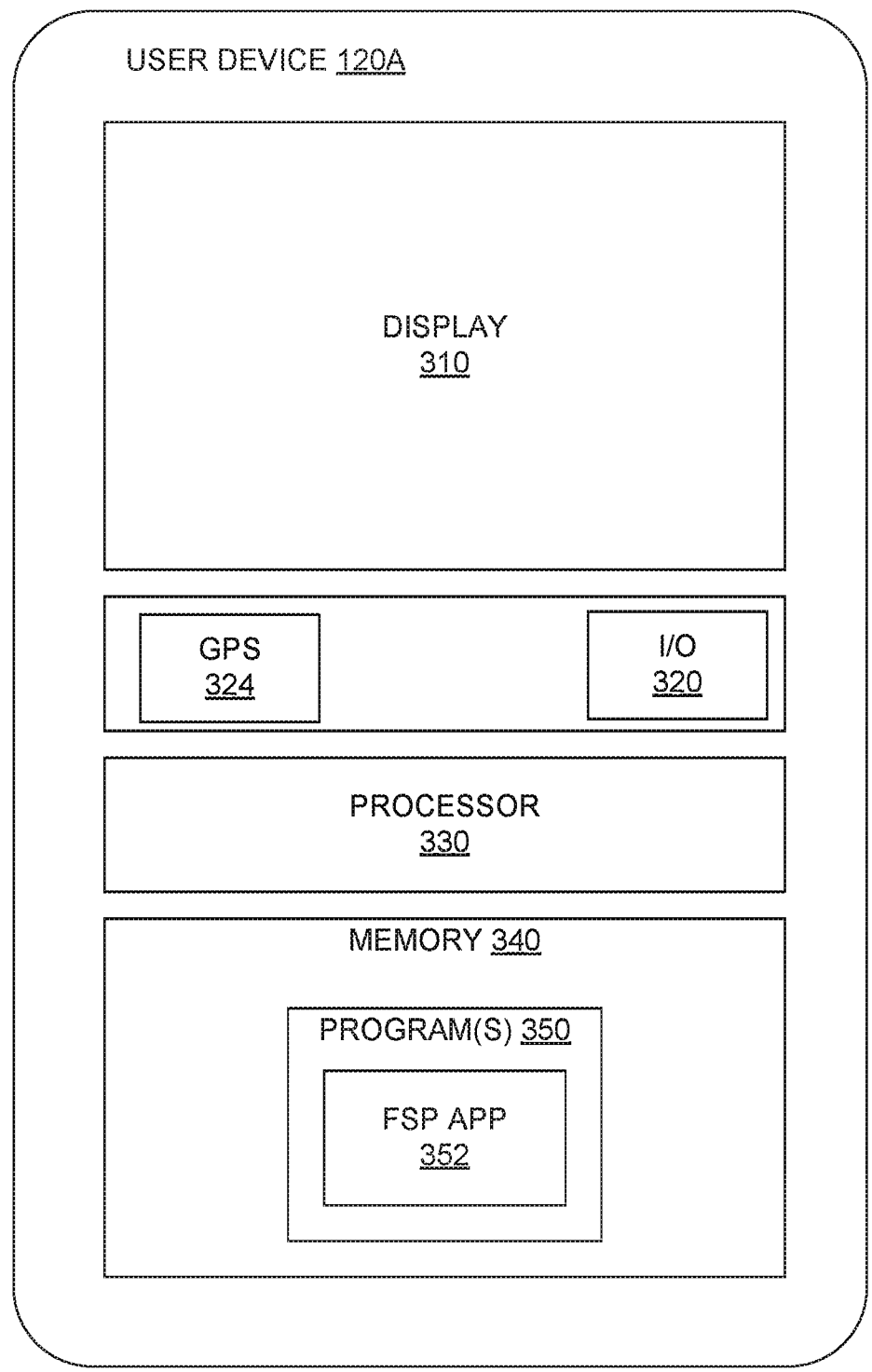
FIG. 3 shows a component diagram of an exemplary user device, consistent with disclosed embodiments.

FIG. 3 shows an exemplary configuration of user device 120A, consistent with disclosed embodiments. User device 120A may allow one or more FSP 110 customers, such as user 120, to receive alerts regarding transactions and/or merchant 140. User device 120A may be a personal computing device. For example, user device 120A may be a general purpose or notebook computer, a mobile device with computing ability, a tablet, a smartphone, or any combination of these computers and/or affiliated components. In one embodiment, user device 120A may be a computer system or mobile computer device that is operated by user 120 who is an FSP 110 customer.

User device 120A may be configured with storage that stores one or more operating systems that perform known operating system functions when executed by one or more processors. By way of example, the operating systems may include Microsoft Windows™ Unix™, Linux™, Android™, Apple™ Computers type operating systems, or other types of operating systems. Accordingly, embodiments of the disclosed invention may operate and function with computer systems running any type of operating system. User device 120A may also include communication software that, when executed by a processor, provides communications with network 130, such as Web browser software, tablet or smart hand held device networking software, etc.

User device 120A may include a display 310 displaying information. Display 310 may include, for example, liquid crystal displays (LCD), light emitting diode screens (LED), organic light emitting diode screens (OLEO), a touch screen, and other known display devices. Display 310 may display various information to user 120. For example, display 310 may display an alert message to user 120 about a transaction associated with a merchant. Display 310 may display touchable or selectable options for user 120 to select, and may receive user selection of options through a touch screen or I/O devices 320.

I/O devices 320 may include one or more devices that allow user device 120A to send and receive information from user 120 or another device. I/O devices 320 may include various input/output devices, such as a keyboard, a mouse-type device, a gesture sensor, an action sensor, a physical button, a camera, oratory input, etc. I/O devices 320 may also include one or more communication modules (not shown) for sending and receiving information from other components in alert system 100 by, for example, establishing wired or wireless connectivity between user device 120A and network 130, by establishing direct wired or wireless connections between user device 120A and server 111, or between user device 120A and merchant server 141. In some embodiments, user device 120A may also include a Global Positioning System (GPS) unit 324. GPS 324 may enable FSP 110 to receive location data of user device 120A for determining the location of user 120.

Other technologies may also be used for locating user 120. For example, user device 120A may use beacon technology. When user 120 walks into a store of merchant 140, user device 120A may communicate with a beacon device provided at merchant 140. The beacon device may send information received from user device 120A to server 111, thereby allowing server 111 to determine that user 120 is located at merchant 140. For another example, user device 120A may scan a bar code at merchant 140, and may provide the bar code information to server 111. Server 111 may determine the location of merchant 140 based on the bar code information, thereby determining the location of user device 120A, hence user 120. In some embodiments, user device 120A (and/or another component of system 100) may determine user 120's location based on a user "checking in" via a social networking site (i.e., Facebook™, Foursquare™, etc.).

User device 120A may include at least one processor 330, which may be one or more known computing processors, such as those described with respect to processor 220 in FIG. 2. Processor 330 may execute various instructions stored in user device 120A to perform various functions, for example, processing an alert message received from server 111 regarding a suspicious transaction and displaying the alert message on display 310.

User device 120A may include a memory 340, which may be a volatile or non-volatile, magnetic, semiconductor, tape, optical, removable, non-removable, or other type of storage device or tangible (i.e., non-transitory) computer-readable medium. Memory 340 may store one or more programs 350. Programs 350 may include operating systems (not shown) that perform known operating system functions when executed by one or more processors. Disclosed embodiments may operate and function with computer systems running any type of operating system. User device 120A may be a device that executes mobile applications for performing operations consistent with disclosed embodiments, such as a tablet or mobile device.

Programs 350 may also include an FSP app 352. Similar to FSP app 252 executed by server 111, FSP app 352 may be executed by processor 330 to perform processes related to financial services including, but not limited to, receiving data from server 111 regarding suspicious transactions, receiving data from server 111 regarding ratings and reviews of merchant 140, receiving alert messages from server 111 and displaying the alert messages on display 310, providing location data to server 111, receiving input from user 120 in response to the alert messages, and sending user input data to server 111.

Figure 4:
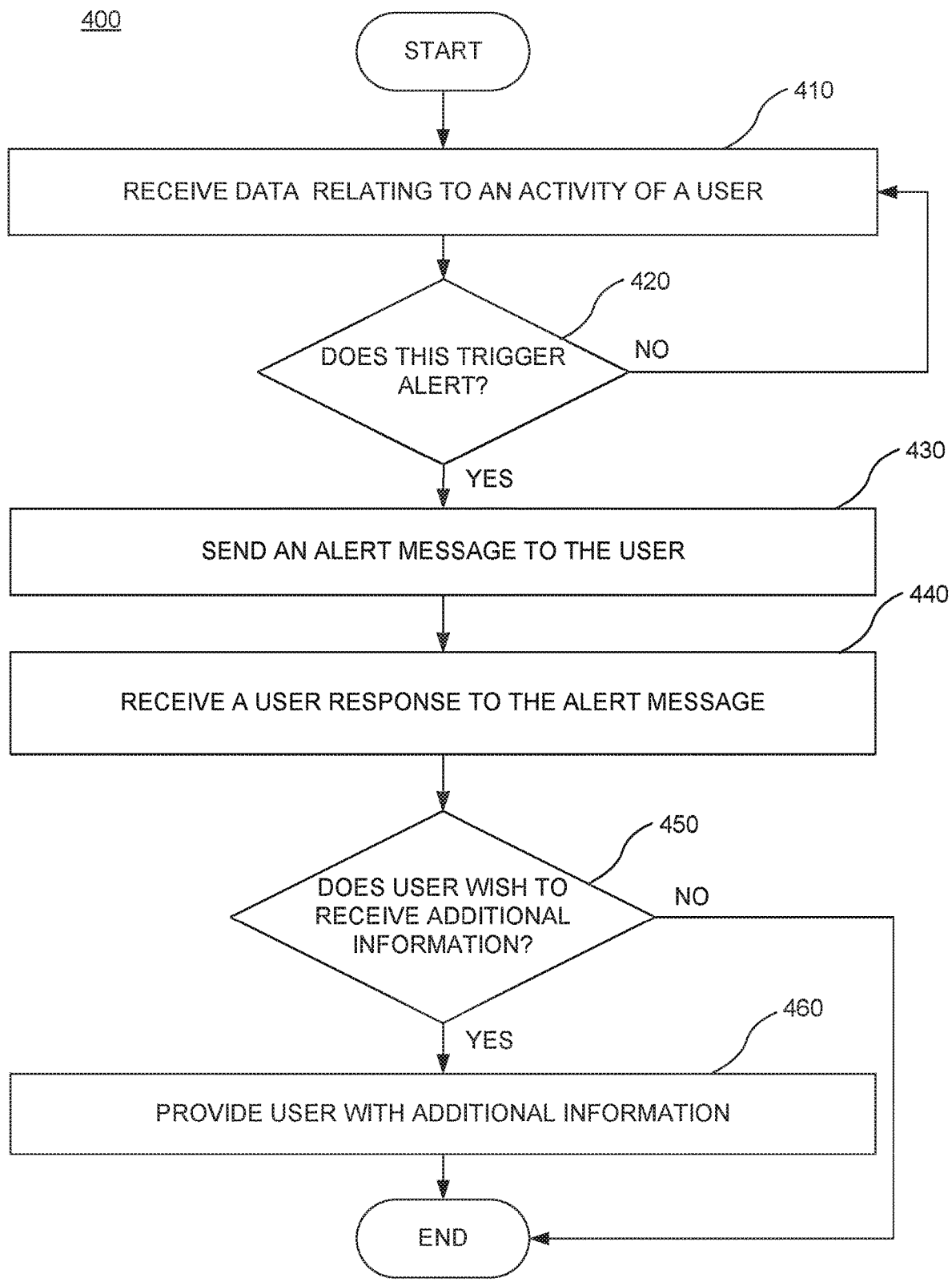
FIG. 4 shows a flowchart of an exemplary method for providing alerts to users, consistent with disclosed embodiments.

FIG. 4 shows a flowchart of an exemplary method 400 for providing alerts to user 120. For discussion purposes, the exemplary methods are described as performed by server 111. In some embodiments, however, user device 120A and/or server 141 of merchant 140 may perform one or more disclosed method steps. In some embodiments, different components of alert system 100 (such as server 111, server 141, and user device processor 330) may perform various steps of the methods in a distributed-computing configuration.

In step 410, server 111 may receive data relating to an activity of user 120. The data relating to the activity of user 120 may include, for example, GPS data received from GPS 324 indicating that user 120 is near or at merchant 140, such as a grocery store, an auto repair shop, an electronic devices retailer, etc. The data relating to the activity of user 120 may also include, for example, data indicating that user 120 is about to make or has made a purchase of products and/or services at merchant 140. In some aspects, data indicating that user 120 is about to make or has made a purchase may include data indicating the user has swiped a bank card on a point of sale terminal at merchant 140. The data relating to the activity of user 120 may further include, for example, location data received from a third party indicating that user 120 has logged into a third party application or has "checked in" using the third party application while user 120 is at or near merchant 140. In some embodiments, when user 120 logs into the third party application or remains logged in, the third party application may obtain location information about user 120 and send location information to user device 120A and/or server 111. The third party application may include, for example, an online chat application, a social network application, a tracking application, etc.

The data relating to an activity of user 120 may also include data indicating suspicious transactions. The data may include, for example, the type of transaction, the frequency (repetition) of the transaction, the deviation of the amount of transaction from a normal or average transaction, the location of the transaction, etc. For example, server 111 may detect that a purchase for gasoline was made with a credit card belonging to a user who is known not to own a vehicle, and/or did not recently rent a vehicle. Server 111 may determine that this type of transaction is out of the scope of a user's 120 normal purchases, and that server 111 should trigger an alert. In another example, server 111 may detect that three transactions for TVs were made within one week involving different merchants, and this frequency may indicate the transaction is suspicious. In another example, server 111 may detect that a payment of $100 is made to a utility company using a credit card or a checking account of user 120. Server 111 may analyze historical payments made to the utility company, and may detect that the $100 payment is $50 more than a typical payment. Server 111 may determine that this deviation should trigger an alert to user 120 asking user 120 to check the bill. For another example, server 111 may detect that a charge was made at a merchant located over 250 miles from where user 120 typically make purchases, and may determine that this activity should trigger an alert to ask user 120 to confirm whether this charge is legitimate or ask user 120 to call the financial institute if something is suspicious. Server 111 may assign a transactional score to each transaction. The transactional score may be based on any one or a combination of the factors discussed above. If the transactional score is higher than a predetermined threshold, the transaction may be legitimate, and an alert may not be triggered. If the transactional score is lower than the predetermined threshold, the transaction may be invalid, and an alert may be triggered.

The data relating to an activity of user 120 may also include other data indicating, for example, large bill variance (e.g., variance of bill payment larger than a predetermined threshold), and small bill variance (e.g., variance of bill payment smaller than a predetermined threshold). The data may also include data indicating performance related to a budget for a certain category. For example, user 120 may have allocated a certain budget for particular spending categories, and the data may include information indicating that spending has or has not, or may soon exceed the budget for certain categories, the amount of excessive spending, etc.

In step 420, server 111 may determine whether the received data relating to an activity of user 120 triggers an alert. If the received data does not trigger an alert (No, step 420), server 111 may continue to receive data relating to activity of user 120. If the received data triggers an alert (Yes, step 420), server 111 may continue to execute step 430. Server 111 may perform various processes to determine whether the received data relating to user activity triggers an alert. For example, server 111 may identify a merchant based at least on the received data Server 111 may access and analyze historical fraud or disputes data, crowd-sourced feedback, etc., which may be associated with at least one of the user and the merchant. Server 111 may determine whether the activity involves or will likely involve a suspicious transaction that may be fraudulent, likely fraudulent, or likely to be subject to disputes, thereby determining whether the received data triggers an alert According to some embodiments, the historical fraud or disputes data may comprise proprietary data collected by FSP 110 associated with FSP 110 customer purchase transactions, identified or suspected fraud (perpetrated by unauthorized users of the financial product or service, customers of FSP 110, merchant(s) 140, etc.), disputed transactions (for example, indicating the number and nature of disputed transactions associated with user 120 and/or merchant(s) 140), etc.

When server 111 determines that the received data relating to the activity of user 120 indicates a suspicious transaction, server 111 may determine that an alert should be triggered. In step 430, server 111 may send an alert message to user 120, e.g., to user device 120A of user 120. The alert message may be displayed on display 310 of user device 120A. The alert message may include options that may be selected by user 120 to indicate whether user 120 desires to receive additional information regarding the transaction and/or merchant. The additional information may include, for example, ratings and reviews of merchant 140. Additional examples of alert messages will be described below with respect to FIGS. 8-10B. In step 440, server 111 may receive a user response to the alert message, including a user selection of any options presented in the alert message. In step 450, server 111 may determine, based on the received user response, whether user 120 desires to receive additional information. If server 111 determines that user 120 does not wish to receive additional information (No, step 450), server 111 may end method 400. If server 111 determines that user 120 wishes to receive additional information (Yes, step 450), server 111 may provide user 120 with additional information in step 460.

Figure 5:
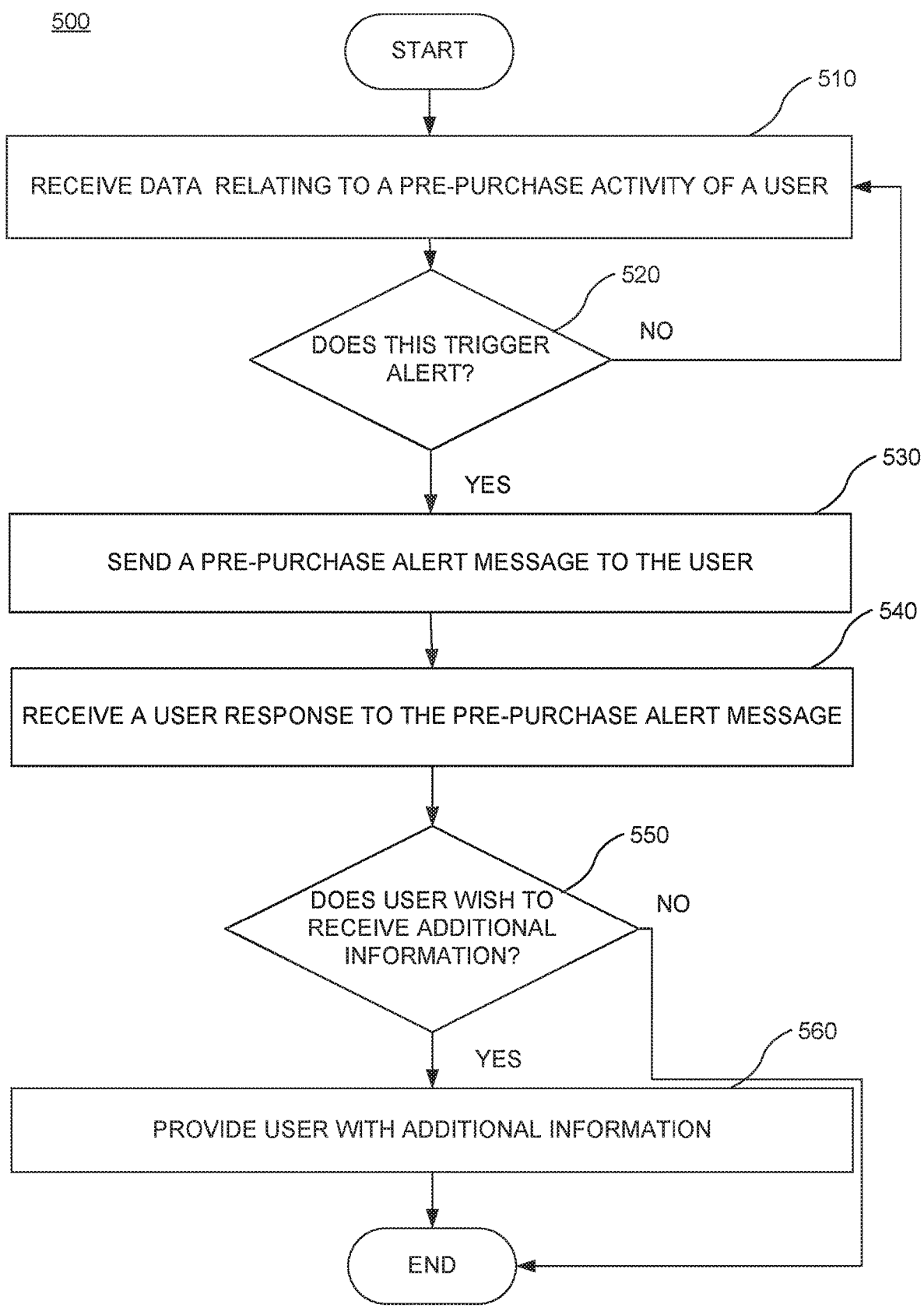
FIG. 5 shows a flowchart of an exemplary method for providing pre-purchase alert messages to users, consistent with disclosed embodiments.

FIG. 5 shows a flowchart of an exemplary method 500 for providing alerts to user 120. Method 500 may be executed by, for example, server 111 to provide a pre-purchase alert to user 120. In step 510, server 111 may receive data relating to a pre-purchase activity of user 120. For example, server 111 may receive positioning data from GPS 324, via user device 120A, indicating the location of user 120. In another embodiment, server 111 may receive positioning data from third party server 150 and determine the location of user 120. For example, third party server 150 may receive user log in or check in information from user device 120A through a third party app installed on user device 120A, through a website visited by user 120 from user device 120A, etc. The third party app may include a function of acquiring user location
through, for example, GPS 324, the user inputting a geographic location, etc. Examples of such third party app include a chat app, tracking app, search engine app, and a social network app, such as Foursquare™.

The pre-purchase activity may also include user 120 swiping a bank card to initiate a purchase, adding items to a virtual shopping cart of an online merchant, etc. In some embodiments, server 111 may receive, from merchant 140, data relating to the swipe of the bank card at a point of sale terminal. For example, merchant 140 may request authorization to complete a purchase transaction using an account of user 120 held by FSP 110. Server 111 may determine that user 120 is located at merchant 140 and is about to make a purchase there.

In step 520, server 111 may determine whether the pre-purchase activity triggers an alert Continuing the above example, after determining the location of user 120, server 111 may analyze data relating to merchant 140. It is to be understood, however, that server 111 need not necessarily determine the location of user 120 to analyze data relating to merchant 140 or to send pre-purchase alerts. In some embodiments, for example, server 111 may receive a request from merchant 140 to authorize a purchase transaction but not know the location of merchant 140 or user 120.

In some embodiments, server 111 may analyze historical fraud or disputes data related to merchant 140. The historical fraud or disputes data related to merchant 140 may include, for example, how many fraudulent transactions or disputes have involved merchant 140 in a past predetermined period of time (e.g., years, months, or days). Server 111 may also analyze crowd-sourced feedback. Crowd-sourced feedback may include ratings and reviews regarding merchant 140 collected from the general public, rather than only from users of FSP 110. In one embodiment, server 111 may primarily rely on historical fraud or dispute data, rather than crowd-sourced feedback, because historical fraud or dispute data from FSP 110 may provide a more accurate analysis result.

In addition, server 111 may determine which products sold by merchant 140 are more likely to be subject to disputes. Server 111 may determine a pattern of disputes associated with merchant 140 based on, for example, the historical fraud or dispute data of FSP 110. Server 111 may also analyze ratings and reviews of merchant 140 based on, for example, crowd-sourced feedback. Server 111 may assign a reputation score to merchant 140 based on a result of at least one of the above analyses. Server 111 may compare the reputation score of merchant 140 to a predetermined threshold score and determine whether merchant 140 has a high reputation score or a low reputation score, as compared to the predetermined threshold, for example. According to some embodiments, the threshold score may be set or based on information provided by FSP 110, user 120, and/or a third party. Server 111 may determine that an alert should be triggered, for example, when the comparison indicates that merchant 140 has a low reputation score.

When server 111 determines that the pre-purchase activity does not trigger an alert (No, step 520), method 500 repeats step 510. When server 111 determines that the pre-purchase activity triggers an alert (Yes, step 520), server 111 may send, in step 530, a pre-purchase alert message to user 120 (via, e.g. user device 120A). The pre-purchase alert message may be displayed on display 310 of user device 120A.

Figure 6:
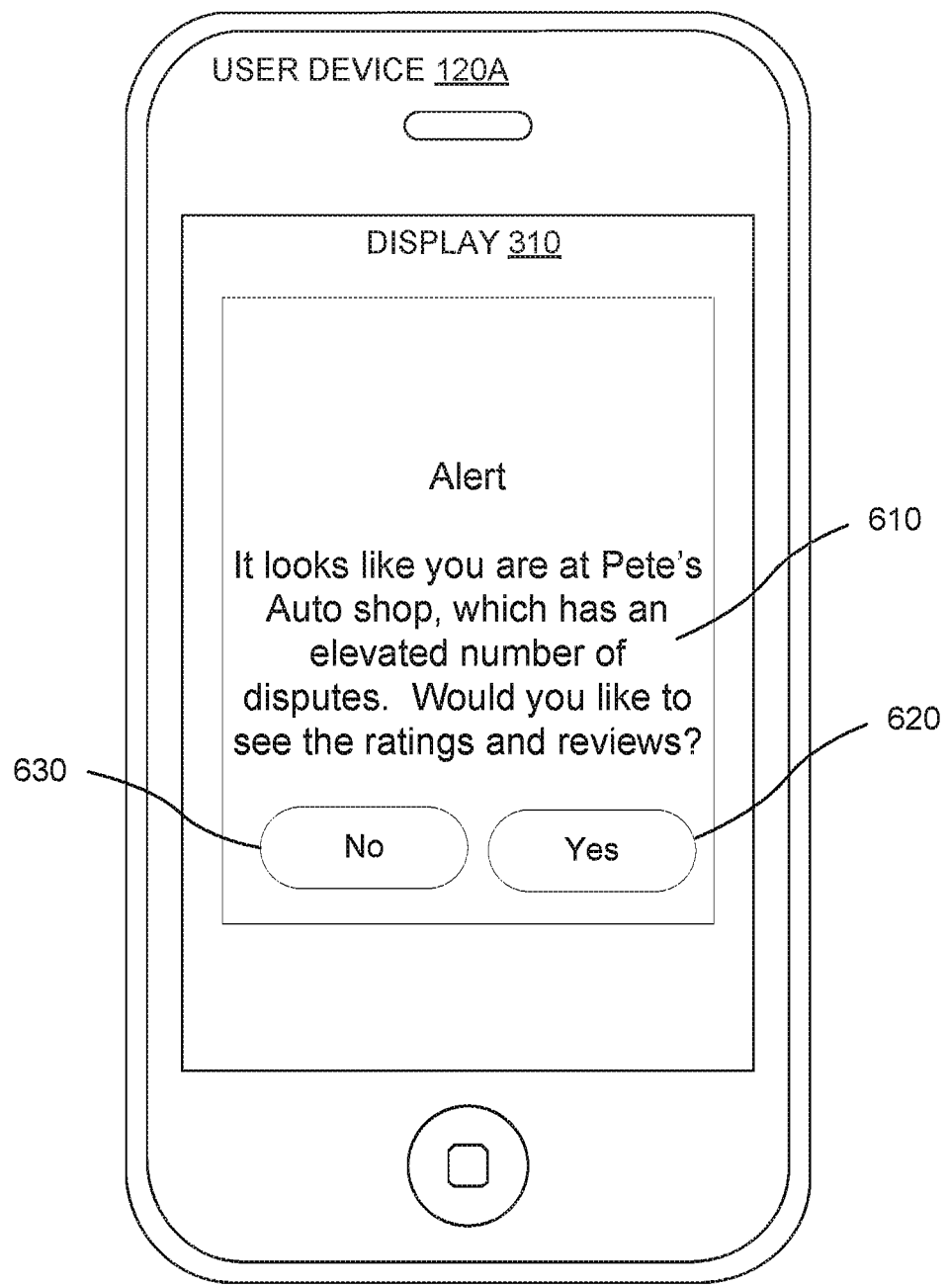
FIG. 6 shows an exemplary pre-purchase alert message displayed on a user device of a user, consistent with disclosed embodiments.

FIG. 6 shows an exemplary pre-purchase alert message 610 that may be displayed on display 310, as part of step 530. The pre-purchase alert message 610 may notify user 120 that user 120 appears to be located at (and/or initiating a purchase at) the merchant, e.g. Pete's Auto Shop, which has an elevated number of disputes. The pre-purchase alert message 610 may ask user 120 whether user 120 would like to receive additional information, such as ratings and reviews, about this merchant. The pre-purchase alert message 610 may provide options, e.g., a Yes button 620 and a No button 630, for user 120 to select to indicate whether user 120 wishes to receive additional information about this merchant. User 120 may select the Yes button 620 to indicate user's desire to receive additional information, or the No button 630 to indicate user's desire not to receive additional information.

Referring back to FIG. 5, in step 540, server 111 may receive a user response to the pre-purchase alert message, which may include a user selection of the Yes button 620 or the No button 630. In step 550, server 111 may determine whether user 120 would like to receive additional information, such as the ratings and reviews of merchant 140, based on the user response received from user 120. If server 111 determines that user 120 does not wish to receive additional information (No, step 550), server 111 may end method 500. If server 111 determines that user 120 wishes to receive additional information (Yes, step 550), server 111 may provide user 120 with additional information in step 560. For example, server 111 may send ratings and/or reviews information about merchant 140 to user device 120A, which may be displayed on display 310. An example of providing ratings and/or reviews information is discussed below in connection with FIG. 10. After reviewing the ratings and/or reviews about merchant 140, user 120 may determine whether or not to make or cancel the transaction.

Figure 7:
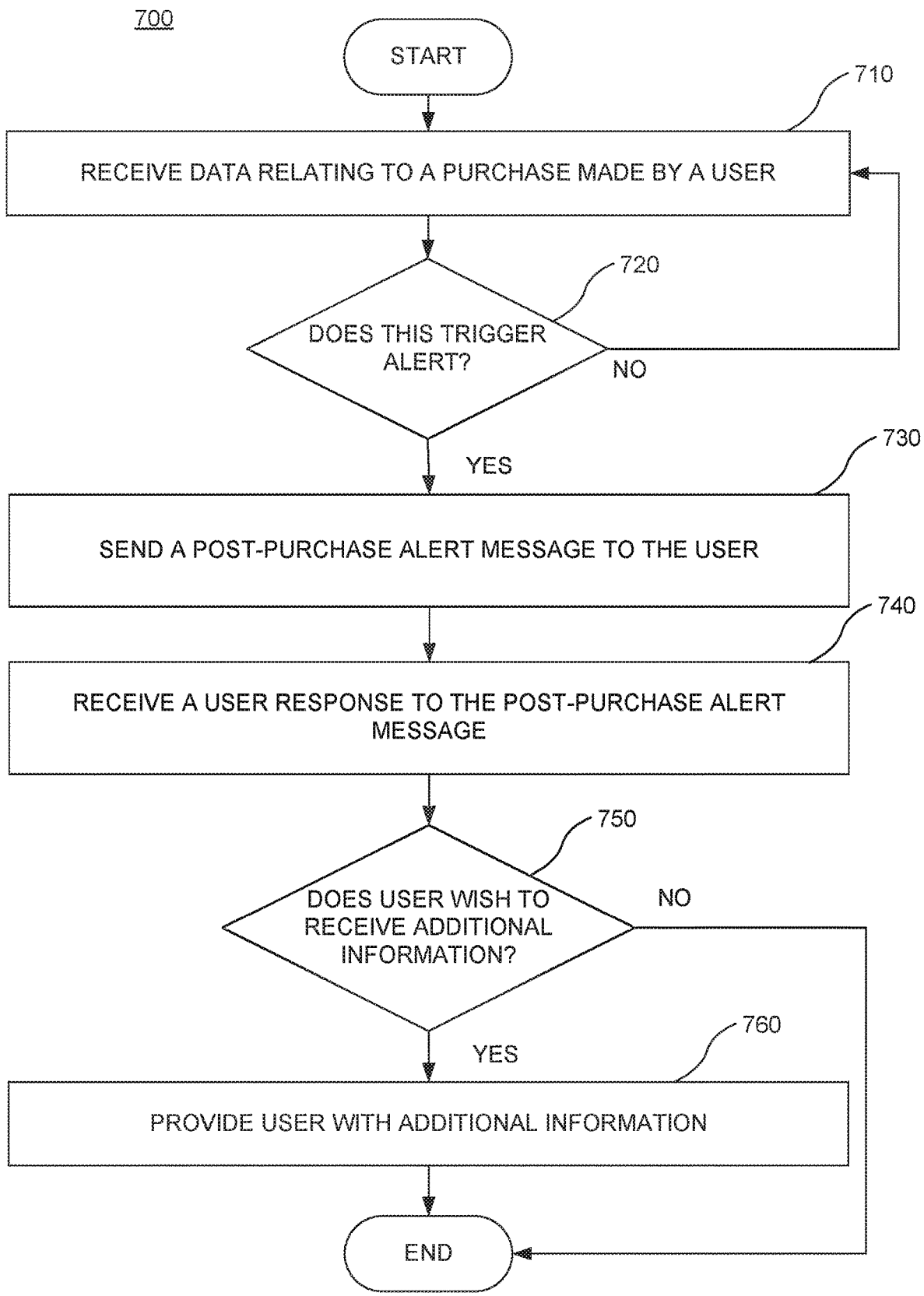
FIG. 7 shows a flowchart of an exemplary method for providing post-purchase alert messages to users, consistent with disclosed embodiments.

FIG. 7 shows a flowchart of an exemplary method 700 for providing alerts to user 120. Method 700 may be executed by, for example, server 111 to provide a post-purchase alert to user 120. In step 710, server 111 may receive data relating to a purchase made by user 120. For example, server 111 may receive an electronic signature of user 120 or other indication that a transaction has been finalized and approved by user 120 at merchant 140 for products or services. In step 720, server 111 may determine whether the data relating to the purchase should trigger an alert. Similar to the above discussion in connection with step 520 in FIG. 5, server 111 may analyze historical fraud or disputes data related to merchant 140, the crowd-sourced feedback, the ratings and/or reviews of merchant 140, the pattern of disputes, and/or the type of products and/or services to determine whether the transaction may be a suspicious transaction. For example, if merchant 140 has an elevated number of disputes in the past three months involving the same or similar type of products or services, server 111 may determine that the transaction user 120 has made could be a suspicious transaction that may either be fraudulent or more likely to be subject to a dispute. Similar to the above discussion with respect to a pre-purchase alert, server 111 may assign a reputation score to merchant 140 based on at least one of the above analyses, and may compare the reputation score to a predetermined threshold score to determine whether merchant 140 has a high or low reputation score, as compared to the predetermined threshold, for example. If server 111 determines that merchant 140 has a high reputation score, an alert may not be triggered. If server 111 determines that merchant 140 has a low reputation score, an alert may be triggered.

If server 111 determines that an alert should not be triggered (No, step 720), server 111 may repeat step 710. If server 111 determines that an alert should be triggered (Yes, step 720), server 111 may send a post-purchase alert message to user 120, for example, through user device 120A The post-purchase alert message may be displayed on display 310.

Figure 8:
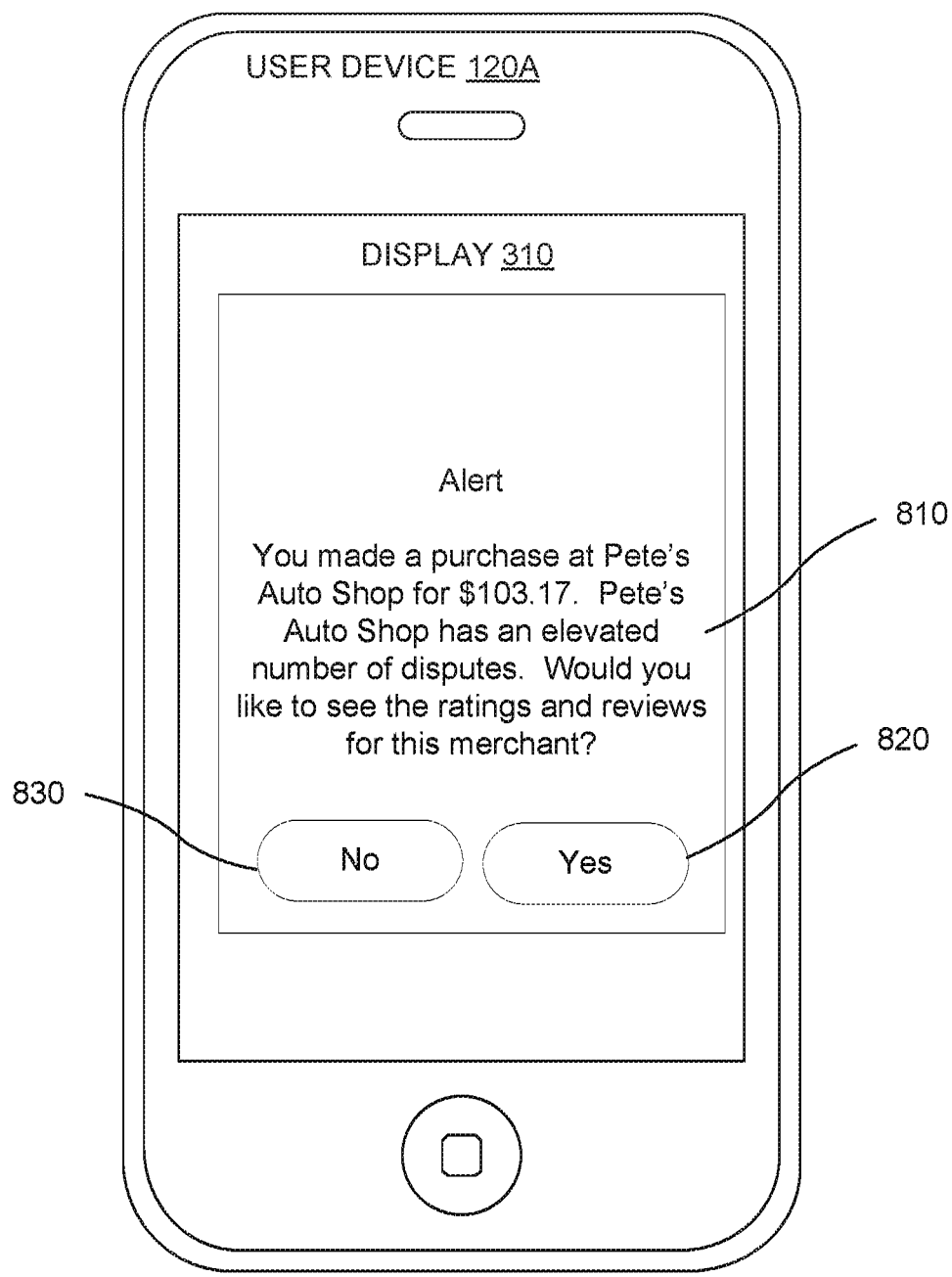
FIG. 8 shows an exemplary post-purchase alert message displayed on a user device of a user, consistent with disclosed embodiments.

An exemplary post-purchase alert message 810 is shown in FIG. 8. Post-purchase alert message 810 may identify the transaction that user 120 has made at Pete's Auto Shop for $103.17, for example, and that Pete's Auto Shop is associated with an elevated number of disputes. Post-purchase alert message 810 may ask user 120 whether user 120 would like to receive additional information, such as ratings and reviews, about this merchant. Post-purchase alert message 810 may provide options, e.g., a Yes button 820 and a No button 830, for user 120 to select to indicate whether user 120 wishes to receive additional information about this merchant. User 120 may select the Yes button 820 to indicate user's desire to receive additional information, or may select the No button 830 to indicate user's desire not to receive additional information. If user 120 takes no action (i.e., does not select the Yes button 820 or the No button 830) within a predetermined period of time (e.g., one hour, one day, etc.) server 111 may send a reminder message to user device 120A for user 120 to check on the transaction. The reminder message may be similar to post-purchase alert message 810.

Referring back to FIG. 7, in step 740, server 111 may receive a user response to the post-purchase alert message, which may include user selection of the Yes button 820 or the No button 830. In step 750, server 111 may determine whether user 120 wishes to receive additional information about merchant 140 based on the user response. For example, if user 120 has selected the No button 830, server 111 may determine that user 120 does not wish to receive additional information about merchant 140 (No, step 750), and server 111 may end method 700. If user has selected the Yes button 820, server 111 may determine that user 120 wishes to receive additional information about merchant 140 (Yes, step 750), and server 111 may continue to execute step 760 to provide the additional information to user 120. For example, server 111 may send ratings and/or reviews information about merchant 140 to user device 120A, which may be displayed on display 310 to user 120. User 120 may review the ratings and/or reviews information about this merchant, and may determine whether the transaction should be cancelled to avoid a potential dispute with merchant 140 in the future. For example, if merchant 140 has a low rating or poor review, user 120 may determine that he/she should return or cancel the purchase to avoid any future dispute. According to some embodiments, server 111 may receive an indication from user 120 (via, e.g., user device 120A) that the transaction should be cancelled, and server 111 may initiate cancellation of the transaction based on the received indication.

Figure 9:
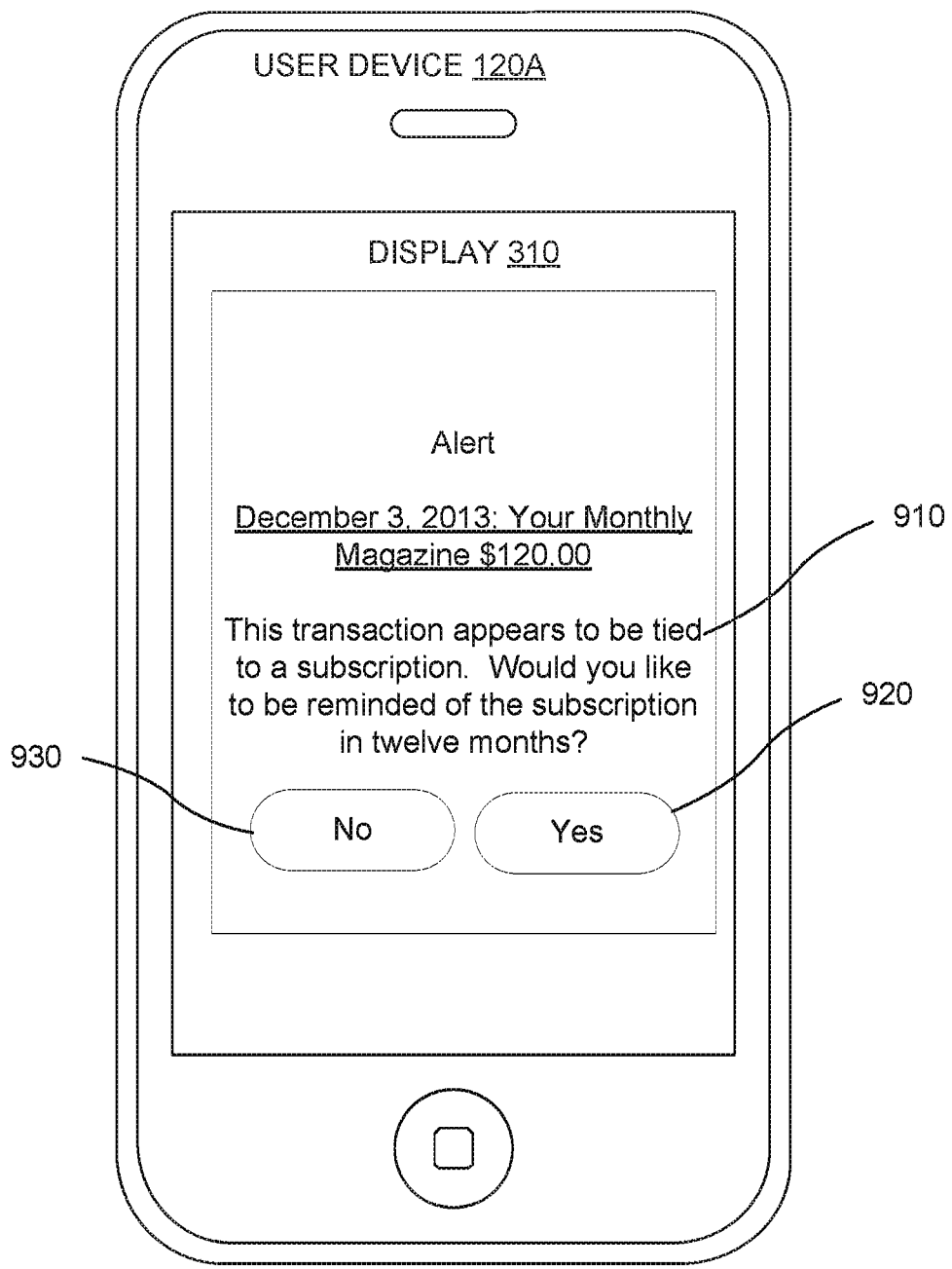
FIG. 9 shows another exemplary post-purchase alert message displayed on a user device of a user, consistent with disclosed embodiments.

FIG. 9 shows another exemplary post-purchase alert message 910 displayed on display 310 of user device 120A. In this embodiment, the post-purchase alert message 910 may notify user 120 that the transaction may be tied to a subscription. In some embodiments, server 111 may analyze the type of transaction to determine whether the transaction is associated with a subscription or a recurring fee (weekly, monthly, annually, etc.). For example, if user 120 has made a purchase of a monthly magazine or a journal, or paid an annual membership fee for a club, server 111 may determine that an annual subscription fee or membership fee is likely due in the next twelve months. The post-purchase alert message 910 may ask user 120 whether user 120 would like to be reminded of the subscription or annual fee due before the next recurring fee is expected. Although twelve months is used as an example, other periods, such as three months or six months, may be determined by server 111 as a suitable period for reminding user 120, based on, for example, historical purchase data associated with user 120. The post-purchase alert message 910 may provide options, e.g., a Yes button 920 and a No button 930, for user 120 to select to indicate whether user 120 would like to receive a reminder. If user 120 selects the Yes button 920, server 111 may set up a reminder that will be sent to user device 120A in 12 months about the subscription fee due or the annual fee due. if user 120 selects the No button 930, server 111 may not set up a reminder.

The pre-purchase alert message 610 and the post-purchase alert messages 810 and 910 are for illustrative purpose only. Many other alert messages may be used in alert system 100. For example, pre-purchase alert messages may include information that notifies user 120 of offers, promotions, benefits, or discounts provided by various bank cards. User 120 may review the offers, promotions, benefits, or discounts associated with the bank cards on display 310, and may determine which bank card should be used for payment of the transaction. For example, in some embodiments, pre-purchase alert messages may notify user 120 that a Bank A credit card offers $10 off $50 at merchant 140. User 120 may determine to use Bank A credit card to take advantage of this offer. For another example, pre-purchase alert messages may notify user 120 that Bank B credit card provides an extended warranty on the type of product user 120 is about to purchase, if user 120 uses Bank B credit card to make the purchase. User 120 may wish to take advantage of the extended warranty by using the Bank B credit card to pay the transaction.

In some embodiments, pre-purchase alert messages may also provide information to user 120 about offers, promotions, or discounts provided by merchant 140, such that user 120 may take advantage of the offers, promotions, or discounts by meeting certain requirements. For example, when server 111 determines that user 120 has swiped a credit card to purchase a TV, server 111 may retrieve information about offers, promotions, or discounts currently provided by merchant 140 from server 141, analyze such information, and determine that merchant 140 currently offers a 10% discount for a bundle purchase of a TV and a DVD player. Server 111 may provide a pre-purchase alert message to user 120 to notify user 120 that if user 120 also purchases a DVD player, user 120 may receive a 10% discount on the total purchase of a TV and a DVD player. User 120 may determine to take advantage of this discount by making an additional purchase of a DVD player from merchant 140. In another example, server 111 may collect offers, promotions, or discounts from various merchants, and may provide a comparison of prices, offers, promotions, or discounts offered by various merchants in favor of this particular merchant 140 to promote sales. Financial service provider 110 may receive some financial incentive (e.g., 1% of the promoted sales completed, regular payment, etc.) from merchant 140 for such services.

In some embodiments, post-purchase alert messages may similarly provide information regarding offers, promotions, benefits, or discounts provided by a bank card or a merchant, as discussed above in connection with the exemplary pre-purchase alert messages. User 120 may determine whether to make an additional purchase or to cancel or return a purchase based on the offers, promotions, benefits, or discounts information included in the post-purchase alert messages.

In some embodiments, post-purchase alert messages may be used for reminding user 120 of recurring dues of credit card bills, utility bills, mortgage, loans, or tuitions. For example, user 120 may have used a checking account or a debit card to pay the credit card bills, utility bills, mortgage, loans, or tuitions. Server 111 may determine the next due dates of various credit cards, utilities, mortgage, loans, or tuitions based on the past due dates, and may provide user 120 an option to receive reminders for upcoming due dates. This may help user 120 avoid any late payments.

Figure 10A:
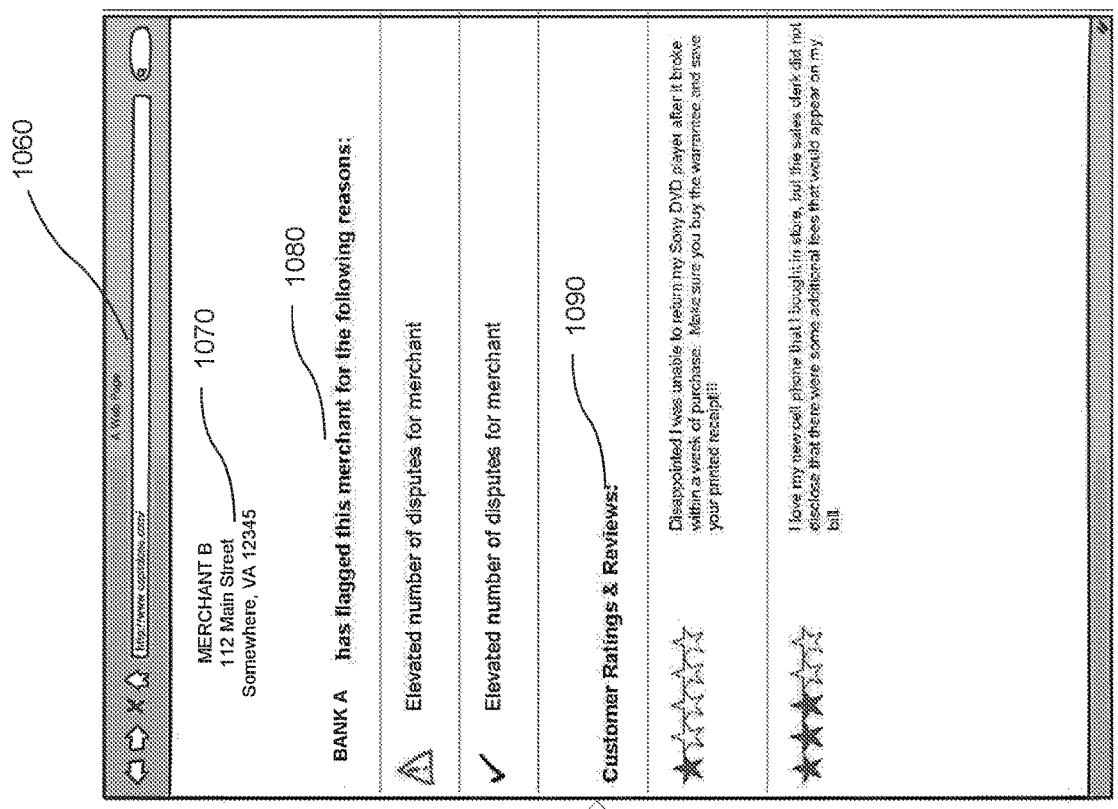
FIGS. 10A and 10B show exemplary user interfaces for providing ratings and reviews of merchants to users, consistent with disclosed embodiments.
Figure 10B:
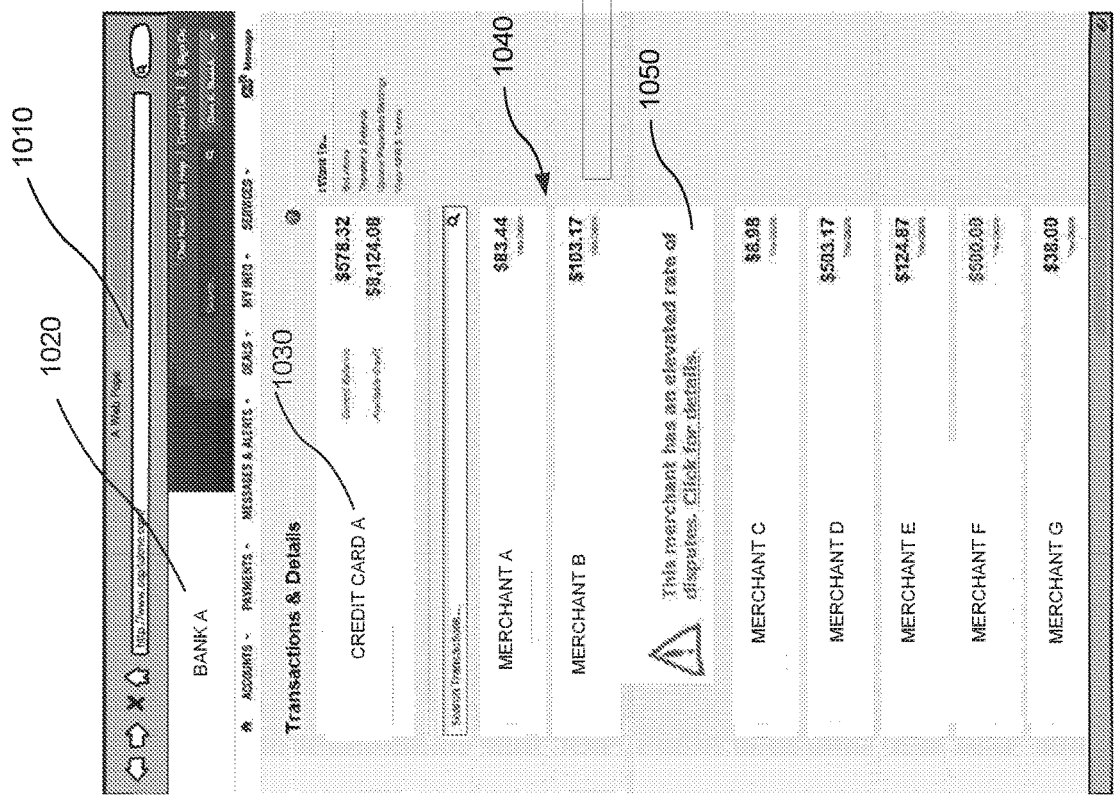

FIGS. 10A and 10B show an exemplary user interface for providing ratings and reviews of merchants to user 120. In the embodiment shown in FIGS. 10A and 10B, the user interface may take the form of a web page 1010 and a web page 1060. Other forms of user interface, such as text-based tables, may also be used for providing ratings and reviews of merchants to user 120. The user interface may be displayed on display 310, for example, after user 120 selects the Yes button 620, 820, or 920, consistent with the above described embodiments. Web page 1010 may be related to a financial institution, e.g., Bank A, which offers credit card A Web page 1010 may show details about user's account with Bank A For example, web page 1010 may show transactions and details related to credit card A. A first section 1030 of web page 1010 may show the current balance and the amount due of credit card A. A second section 1040 of web page 1010 may show a list of transactions made at different merchants A, B, C, D, E, F, and G. User 120 may click on one of the merchants to open up another web page 1060, for example, to view additional information about the selected merchant. Alternatively or additionally, second section 1040 may display an alert message 1050 associated with a merchant, such as merchant B, to alert user 120 that this merchant has an elevated rate of disputes, and may provide a hyper-link, such as the one named "Click for details" shown in FIG. 10A. User 120 may click or select the hyper-link to open up web page 1060, for example, to view details about this merchant.

Web page 1060 may display additional information about a merchant, including, for example, the name and address 1070 of merchant B, a message 1080 indicating that Bank A has flagged this merchant because of an elevated number of disputes. \Neb page 1060 may also display customer ratings and reviews 1090. Customer ratings and reviews information may be received by server 111 from users of FSP 110, for example, as part of historical disputes data. Customer ratings and reviews information may also be collected or retrieved by server 111 from various other sources. For example, server 111 may collect or retrieve ratings and reviews information from third party websites, such as, for example, online merchants, social network websites, the Better Business Bureau or other business rating entity, and/or any other entity providing a forum for customers to share their ratings and reviews about merchants.

Figure 11:
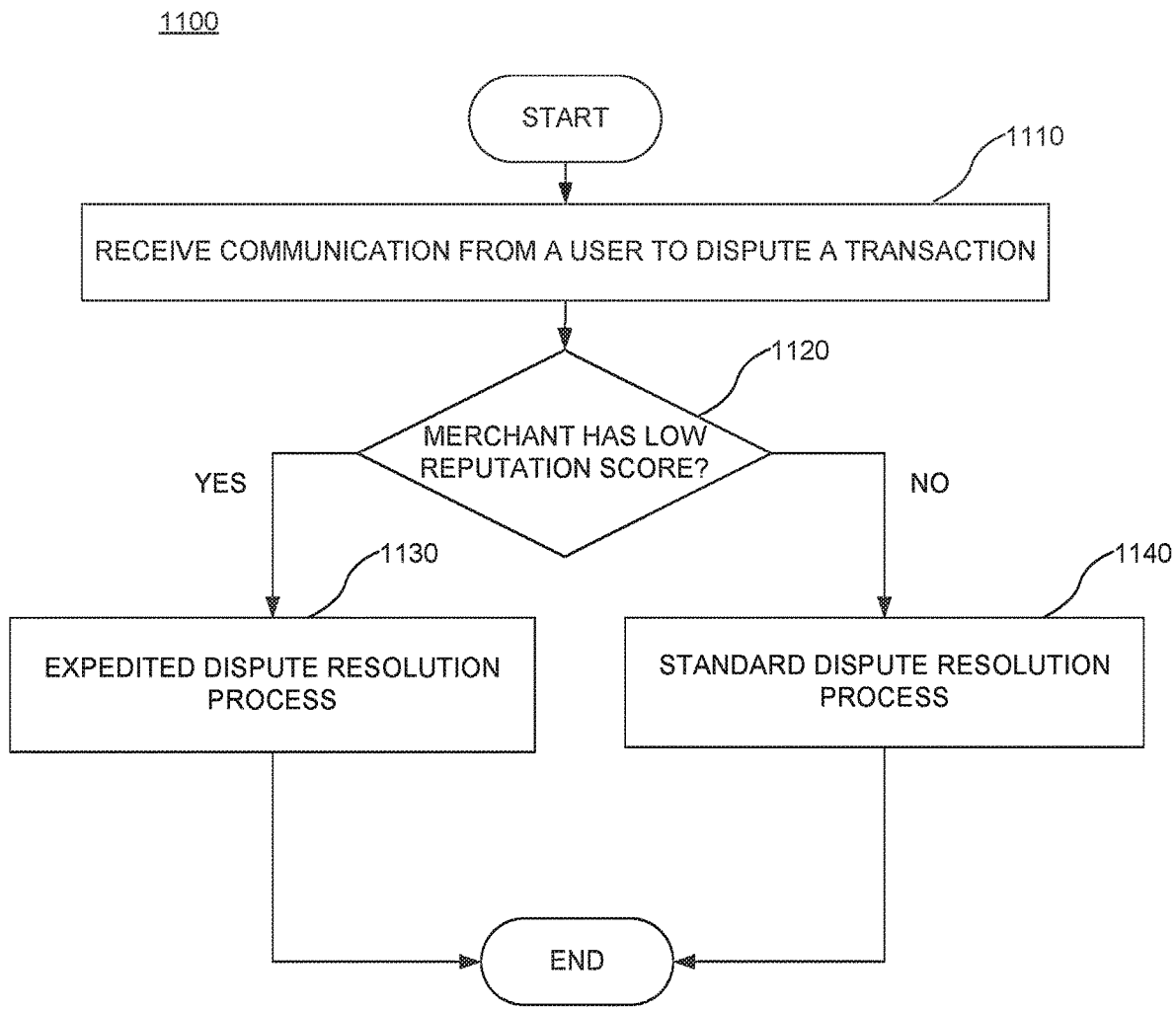
FIG. 11 shows a flowchart of an exemplary method for providing a differentiated dispute workflow, consistent with disclosed embodiments.

FIG. 11 shows a flowchart of an exemplary method 1100 for providing a differentiated dispute workflow. Method 1100 may be executed by, for example, server 111. Server 111 may handle a dispute brought by user 120 in different processes, depending on, e.g., whether the merchant has a low reputation score or whether the user 120 has a history of disputing transactions and whether those disputed transactions were ultimately determined to be valid transactions. In step 1110, server 111 may receive communication from a user to dispute a transaction made with merchant 140. For example, server 111 may receive an electronic message or indication of a telephone call from user 120 who wishes to dispute a transaction made with merchant 140. User 120 may claim that the transaction is unauthorized, fraudulent, or that merchant 140 abused user 120 by overcharging, sending user 120 a defective product, refusing to accept a return, etc. Server 111 may determine whether merchant 140 has a low reputation score in step 1120. Server 111 may perform similar analyses discussed above in connection with FIGS. 5 and 7, including, for example, analysis of the historical fraud or disputes data associated with merchant 140, analysis of the ratings and reviews of merchant 140, analysis of the type of products and/or services, analysis of the number of disputes in the past predetermined time period, and analysis of the pattern of disputes. Similar to the above discussion in connection with FIGS. 5 and 7, server 111 may assign a reputation score to merchant 140 based on at least one of the above analyses. For example, if merchant 140 has an elevated number of disputes in the past three months, merchant 140 may receive a low reputation score. If merchant 140 has a relatively low number of disputes in the past three months, merchant 140 may receive a high reputation score. Server 111 may compare the reputation score of merchant 140 with a predetermined threshold reputation score to determine whether the reputation score of merchant 140 is high or low, as compared to the predetermined threshold, for example.

If server 111 determines that merchant 140 has a low reputation score (Yes, step 1120), server 111 may initiate an expedited dispute resolution process 1130 to resolve the dispute. The expedited dispute resolution process 1130 may resolve the dispute in an expedited manner. For example, because merchant 140 has a low reputation score, server 111 may determine that the dispute brought by user 120 is more likely legitimate, and a favorable solution should be given to user 120. According to some embodiments, expedited dispute resolution process 1130 may include removing the transaction from the customer's account immediately (before investigating the dispute), and FSP 110 may absorb the risk/cost of the transaction if the disputed transaction is ultimately resolved in merchant 140's favor. If server 111 determines that merchant 140 does not have a low reputation score (No, step 1120), server 111 may initiate a standard dispute resolution process 1130 to resolve the dispute. For example, because merchant 140 has a high reputation score, which may mean merchant 140 is not often involved in disputes, a standard dispute resolution process 1140 should be taken to resolve the dispute. The standard dispute resolution process 1140 may perform a more thorough investigation about the transaction, the merchant, and the user to resolve the dispute. Thus, the standard dispute resolution process 1140 may take longer time to resolve the dispute than the expedited dispute resolution process 1130.

Although not shown in FIG. 11, it is understood that the differentiated dispute workflow may also be based on a reputation score of user 120 or a transactional score of the transaction, instead of a reputation score of merchant 140. Additionally, the differentiated dispute workflow may be based on a combined score with at least one of the reputation score of user 120, the reputation score of merchant 140, and the transactional score. In other words, server 111 may decide whether the dispute should be processed with the expedited dispute resolution process 1130 or the standard dispute resolution process 1140 based on the reputation score of user 120, the reputation score of merchant 140, or the transactional score, or any combination of these scores. In some embodiments, a user reputation score may identify whether the user has a history of disputing transactions, whether those disputes were resolved in favor of user 120 or merchant 140, whether the user is considered by FSP 110 to be in good standing, or whether the user is a participant in program(s) that include expedited dispute resolution as a benefit, etc. For example, in one embodiment, server 111 may process the dispute with the expedited dispute resolution process 1130 when it determines that user 120 has a high reputation score, or when it determines that the combined reputation score is low (indicating, for example, user 120 has a high reputation score and merchant 140 has a low merchant score). Server 111 may process the dispute with the standard dispute resolution process 1140 when it determines that user 120 has a low reputation score, or when it determines that the combined reputation score of user 120 and merchant 140 is high (indicating, for example, user 120 has a low reputation score and merchant 140 has a high merchant score).

In some embodiments, server 111 may determine whether the transactional score is higher than a predetermined threshold score. If the transactional score is higher than the predetermined threshold score, which may indicate that the transaction is more likely valid, server 111 may process the dispute with the standard dispute resolution process 1140. If the transactional score is lower than the predetermined threshold score, which may indicate that the transaction is more likely invalid, server 111 may process the dispute with the expedited dispute resolution process 1130.

In some embodiments, server 111 may determine whether a combined score, which may combine at least one of the reputation score of user 120, the reputation score of merchant 140, or the transactional score, is higher or lower than a predetermined threshold score. The combination may assign different weights (e.g., 20%, 50%, 30%) to the reputation score of user 120, the reputation score of merchant 140, and/or the transactional score. If the combined score is higher than the predetermined threshold score, which may indicate that the transaction is more likely valid, server 111 may process the dispute with the standard dispute resolution process 1140. If the combined score is lower than the predetermined threshold score, which may indicate that the transaction is more likely invalid, server 111 may process the dispute with the expedited dispute resolution process 1130.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware or software alone.

While the above embodiments describe providing alerts to user 120, it is understood that alert system 100 may also provide alerts to merchant 140. For example, when user 120 swipes a bank card at a point of sale terminal at merchant 140, server 111 may analyze the historical fraud or disputes data associated with user 120, and may determine that user 120 has a low reputation score. Server 111 may provide a pre-purchase alert message to merchant 140 to notify merchant 140 that user 120 may have a low credit rating, a high risk for fraud, or a high likelihood to bring a dispute about the purchase in near future. Merchant 140 may take appropriate measures (decline the purchase, require cash, etc.) to prevent potential loss based on information included in the pre-purchase alert message about user 120, or any additional information about user 120 that server 111 may provide via options included in the pre-purchase alert message. For example, merchant 140 may be a car dealer, who may decline to sell a car to user 120 after receiving a pre-purchase alert message from server 111 indicating that user 120 has a history of bringing disputes or lawsuits against various car dealers. Pre-purchase alert messages may also include offers, promotions, discounts, or benefits information that server 111 collects from various sources of merchant 140, such that merchant 140 may relay such information to user 120 to promote sales, or such that merchant 140 may match a competitor's offer in order to persuade user 120 to make the same purchase at merchant 140 rather than at the competitor's store.

Computer programs based on the written description and methods of this specification are within the skill of a software developer. The various programs or program modules can be created using a variety of programming techniques. For example, program sections or program modules can be designed in or by means of Java, C, C++, HTML, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for expediting, using graphical user interfaces, resolution of disputes, comprising:
   a memory storing software instructions; and
   one or more processors configured to execute the software instructions to perform operations comprising:
      receiving user activity data relating to a merchant;
      responsive to receiving the user activity data, generating a reputation score for the merchant based on historical data associated with the merchant;
      determining that the reputation score triggers an alert;
      generating a first display for presenting an alert message to a user, wherein the alert message includes an identification of the merchant and one or more options for the user to select to receive additional information regarding the alert;

transmitting the first display to a user device;

receiving, from the user device, a selection of an option to receive the additional information about the merchant;

based on receiving the selection of the option to receive the additional information about the merchant, generating a second display comprising reputation data associated with the merchant;

transmitting the second display to the user device;

receiving, from the user device, a request to initiate dispute resolution; and in response to the request to initiate the dispute resolution, selecting a dispute resolution workflow of a plurality of dispute resolution workflows based on the reputation score of the merchant, wherein the dispute resolution workflow resolves a dispute by crediting an account of the user with a disputed amount.

2. The system of claim 1, wherein the user activity data relating to the merchant comprises information related to a transaction.

3. The system of claim 2, further comprising, determining whether the transaction is suspicious based on at least one of a deviation of an amount of the transaction from a normal or average amount, a location of the transaction, a type of the transaction, or a frequency of the transaction, in response to receiving the user activity data relating to the transaction with the merchant.

4. The system of claim 1, wherein the reputation data comprises ratings or reviews related to the merchant.

5. The system of claim 1, wherein the user activity data includes one or more of:
GPS data indicating that the user is near or at the merchant;
pre-purchase data indicating that the user is going to conduct a transaction with the merchant;
third party data indicating that the user has logged into a third party application;
suspicious transaction data;
the user adding items to a virtual shopping cart;
a user bank card associated with the user was swiped; or
transaction value variance data.

6. The system of claim 1, wherein the historical data associated with the merchant comprises rating or review information about the merchant.

7. The system of claim 1, wherein the one or more processors are further configured to determine whether the reputation score exceeds a predetermined fraud threshold, wherein the predetermined fraud threshold is set by the user.

8. A method for expediting, using graphical user interfaces, resolution of disputes with merchants, the method comprising:
receiving user activity data relating to a merchant;
responsive to receiving the user activity data, generating a reputation score for the merchant based on historical data associated with the merchant;
determining that the reputation score triggers an alert;
generating a first display for presenting an alert message to a user, wherein the alert message includes an identification of the merchant and one or more options for the user to select to receive additional information regarding the alert;
transmitting the first display to a user device;
receiving, from the user device, a selection of an option to receive the additional information about the merchant;
based on receiving the selection of the option to receive the additional information about the merchant, generating a second display comprising reputation data associated with the merchant;
transmitting the second display to the user device;
receiving, from the user device, a request to initiate dispute resolution; and
in response to the request to initiate the dispute resolution, selecting a dispute resolution workflow of a plurality of dispute resolution workflows based on the reputation score of the merchant, wherein the dispute resolution workflow resolves a dispute by crediting an account of the user with a disputed amount.

9. The method of claim 8, wherein the user activity data relating to the merchant comprises information related to a transaction.

10. The method of claim 9, further comprising, determining whether the transaction is suspicious based on at least one of a deviation of an amount of the transaction from a normal or average amount, a location of the transaction, a type of the transaction, or a frequency of the transaction, in response to receiving the user activity data relating to the transaction with the merchant.

11. The method of claim 8, wherein the reputation data comprises ratings or reviews related to the merchant.

12. The method of claim 8, wherein the user activity data includes one or more of:
GPS data indicating that the user is near or at the merchant;
pre-purchase data indicating that the user is going to conduct a transaction with the merchant;
third party data indicating that the user has logged into a third party application;
suspicious transaction data;
the user adding items to a virtual shopping cart;
a user bank card associated with the user was swiped; or
transaction value variance data.

13. The method of claim 8, wherein the historical data associated with the merchant comprises rating or review information about the merchant.

14. The method of claim 8, further comprising determining whether the reputation score exceeds a predetermined fraud threshold, wherein the predetermined fraud threshold is set by the user.

15. A non-transitory computer readable medium for expediting, using graphical user interfaces, resolution of disputes with merchants, that when executed by one or more processors implement a method for:
receiving user activity data relating to a merchant;
responsive to receiving the user activity data, generating a reputation score for the merchant based on historical data associated with the merchant;
determining that the reputation score triggers an alert;
generating a first display for presenting an alert message to a user, wherein the alert message includes an identification of the merchant and one or more options for the user to select to receive additional information regarding the alert;
transmitting the first display to a user device;
receiving, from the user device, a selection of an option to receive the additional information about the merchant;
based on receiving the selection of the option to receive the additional information about the merchant, generating a second display comprising reputation data associated with the merchant;
transmitting the second display to the user device;

receiving, from the user device, a request to initiate dispute resolution; and in response to the request to initiate the dispute resolution, selecting a dispute resolution workflow of a plurality of dispute resolution workflows based on the reputation score of the merchant, wherein the dispute resolution workflow resolves a dispute by crediting an account of the user with a disputed amount.

16. The non-transitory computer readable medium of claim 15, wherein the user activity data relating to the merchant comprises information related to a transaction.

17. The non-transitory computer readable medium of claim 16, further comprising, determining whether the transaction is suspicious based on at least one of a deviation of an amount of the transaction from a normal or average amount, a location of the transaction, a type of the transaction, or a frequency of the transaction, in response to receiving the user activity data relating to the transaction with the merchant.

18. The non-transitory computer readable medium of claim 15, wherein the reputation data comprises ratings or reviews related to the merchant.

19. The non-transitory computer readable medium of claim 15, wherein the user activity data includes one or more of:
   GPS data indicating that the user is near or at the merchant;
   pre-purchase data indicating that the user is going to conduct a transaction with the merchant;
   third party data indicating that the user has logged into a third party application;
   suspicious transaction data;
   the user adding items to a virtual shopping cart;
   a user bank card associated with the user was swiped; and
   transaction value variance data.

20. The non-transitory computer readable medium of claim 15, wherein the historical data associated with the merchant comprises rating or review information about the merchant.

* * * * *